United States Patent [19]

Brakelmann

[11] 4,086,425
[45] Apr. 25, 1978

[54] THREE-PHASE CABLE SYSTEM WITH COMPENSATION OF LONGITUDINAL VOLTAGES INDUCED IN ACCOMPANYING RETURN-FLOW PIPES FOR COOLING WATER

[75] Inventor: Heinrich Brakelmann, Kamp-Kintfort, Germany

[73] Assignee: Felten & Guilleaume Carlswerk AG, Cologne, Germany

[21] Appl. No.: 787,071

[22] Filed: Apr. 13, 1977

[30] Foreign Application Priority Data

Apr. 14, 1976 Germany ............................ 2616368

[51] Int. Cl.² ............................................ H01B 7/34
[52] U.S. Cl. .................................. 174/15 C; 174/27; 174/37
[58] Field of Search ................... 174/15 C, 27, 37; 307/149, 89, 91

[56] References Cited

U.S. PATENT DOCUMENTS

| 3,818,116 | 6/1974 | Kuljian | 174/15 C |
| 3,869,562 | 3/1975 | Eidinger et al. | 174/27 X |
| 3,903,355 | 9/1975 | Rasquin | 174/27 X |
| 3,919,456 | 11/1975 | Floessel | 174/27 |

FOREIGN PATENT DOCUMENTS

| 2,357,270 | 5/1975 | Germany | 174/15 C |

*Primary Examiner*—Arthur T. Grimley
*Attorney, Agent, or Firm*—Michael J. Striker

[57] ABSTRACT

Three single-conductor cables are laid down such that viewed in cross-section they are located at the vertices of an equilateral triangle, or else they are laid down in a common plane. Each cable is internally water cooled, and provided with a respective return-flow pipe for cooling water. The return-flow pipes are located on phase-angle loci for two phase angles $\varphi_{l_1}$ and $\varphi_{l_2}$, where the phase angle in question is the phase angle of the longitudinal voltage induced in the return-flow pipes by current flowing in the cables. The two phase angles differ by 180°. As a result, no longitudinal voltages are induced in the return-flow pipes and/or the longitudinal voltages induced in successive sections of the pipes cancel each other out so as to result in no net induced longitudinal voltage.

7 Claims, 4 Drawing Figures

THREE-PHASE CABLE SYSTEM WITH COMPENSATION OF LONGITUDINAL VOLTAGES INDUCED IN ACCOMPANYING RETURN-FLOW PIPES FOR COOLING WATER

BACKGROUND OF THE INVENTION

The present invention relates to a three-phase cable system comprised of three single-conductor cables each provided with internal water cooling and each provided with a respective cooling-water return-flow pipe.

In laying down fluid-cooled high-power cables, the cooled cable can be provided with one or a plurality of adjoining return-flow pipes for returning the cooling water to a cooling station. In such a case, it is possible, for example, to lay three return-flow pipes parallel to the three cooled cables of the three-phase cable system, with the return-flow pipes being made of high-quality corrosion-resistant steel, each pipe having the same flow cross-section as the cooling-water passage within the respective one of the three single-conductor cooled cables. This expedient appears to be the most advantageous approach with respect to production and installation of the cable system.

In such a set-up, the currents flowing in the cables induce longitudinal voltages in the return-flow pipes; these induced voltages can lead either to unacceptably high surface or contact voltages or else, if the return-flow pipes are grounded at both ends, to unacceptably great energy losses in the power-transmission system.

SUMMARY OF THE INVENTION

It is a general object of the invention to provide a cable system of the general type in question in which the return-flow pipes are substantially free of induced longitudinal currents.

According to one advantageous concept of the invention, this is achieved by locating the return-flow pipes on loci for the phase angle $\varphi_1$ of the voltages induced in the pipes. These phase-angle loci can be derived from the following equation:

$$\varphi_{1_{1,2}} = \arctan \frac{\ln \frac{[a^2 + R^2 + 2aR\cos(\varphi + 30°)]^2}{R^2[a^2 + R^2 + 2aR\cos(\varphi - 30°)]}}{\sqrt{3}\ln \frac{R^2}{[a^2 + R^2 + 2aR\cos(\varphi - 30°)]}}$$

if the three angle-conductor cables are arranged at the vertices of an equilateral triangle, or from the equation $$\varphi_{1_{1,2}} = \arctan \left( \frac{-\ln \frac{(a^2 + R^2 - 2aR\sin\varphi)^2}{R^2(a^2 + R^2 + 2aR\sin\varphi)}}{\sqrt{3}\ln \frac{a^2 + R^2 + 2aR\sin\varphi}{R^2}} \right)$$

if the three single-conductor cables are arranged in a single plane, with $\varphi_{1_1} \leq 90°$ and $\varphi_{1_2} = \varphi_{1_1} + 180°$ where $a$ is the distance between adjoining cables, and $R$ is the distance vector of a return-flow pipe from one of the cables and, with the single-plane arrangement, from the middle cable in particular, and $\varphi$ is the position angle, i.e., the angle between the distance vector and a symmetry line of the cable system.

The invention is based upon the concept of not preventing the induction of longitudinal voltages in the return-flow pipes, but instead utilizing a special positioning expedient, in which the return-flow pipes are located on certain phase-angle loci, such that the induced longitudinal voltages compensate one another.

It is of particular advantage if all three return-flow pipes are located at the point of intersection of the two loci for the phase angles $\varphi_{1_1} = 60°$ and $\varphi_{1_2} = 240°$, at the geometrical center of the equilateral triangle formed by the three single-conductor cables. The choice of the phase angles $\varphi_{1_1} = 60°$ and $\varphi_{1_2} = 240°$ results in minimal transverse breadth of the cable system and in minimal total space requirement. By arranging all three return-flow pipes packed together in the center of the cable system, the work involved in grounding is relatively small.

However, if the three single-conductor cables are located at the vertices of an equilateral triangle, then according to the invention it may also be advantageous to locate only one return-flow pipe at the geometric center of the triangle. In that event, each one of the other two pipes would be located, over equal parts of its length, on first one and then the other of the phase-angle loci for the phase angles $\varphi_{1_1} = 60°$ and $\varphi_{1_2} = 240°$.

Thus, according to the invention, a compensation for the longitudinal voltages induced in the return-flow pipes is achieved merely by utilizing a special laying arrangement of the pipes themselves; it becomes unnecessary to resort to either a complicated crossing-over of the individual cable conductors, or to a one-end grounding of the return-flow pipes, or to the possible use of intermediate insulating members, for the purpose of positively preventing the induction of the longitudinal voltages and/or for counteracting the interfering effects which they produce.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
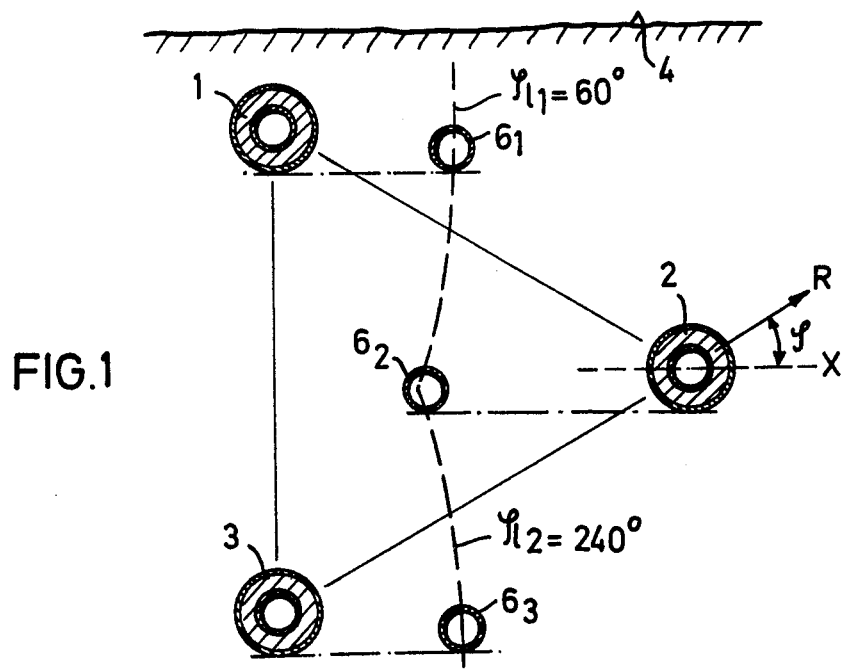
FIGS. 1 to 4 depict four different exemplary embodiments of the invention.

DESCRIPTION OF THE PREFERRED EMBODIMENTS:

The cable system depicted in FIG. 1 is comprised of three single-conductor cables 1, 2, 3 each provided with internal water cooling. The three cables 1, 2, 3 are located (as viewed in cross-section) at the vertices of an equilateral triangle. Two of the three cables are arranged one vertically above the other, and the line conncting them forms a right angle with the surface of the earth 4. The return-flow pipes $6_1$, $6_2$, $6_3$ are so disposed that the return-flow pipe $6_2$ associated with single-conductor cable 2 is located (as viewed in cross-section) at the geometric center of the equilateral triangle in question, corresponding to the point of intersection of the two phase-angle loci for the phase angles $\varphi_{1_1} = 60°$ and $\varphi_{1_2} = 240°$; these loci are indicated in broken lines. These phase angles $\varphi_1$ are the phase angles of the voltage induced in the return-flow pipes. Each one of the two return-flow pipes $6_1$ and $6_3$ extends for one-half of its length at a position on the locus for phase angle $\varphi_{1_1}$ = 60° and for the other half of its length at a position on the locus for phase angle $\varphi_{1_2} = 240°$. Consequently, the longitudinal voltages induced in each one of these two return-flow pipes are of equal amplitude but differ in phase by 180°, so as to cancel each other out. The angle $\varphi$ is the angle between the distance vector R and a symmetry line X of the cable system. The distance vector R is the vector extending between any points on the loci and one of the single-conductor cables. For any given point on one of the loci the distance vector R will have a certain magnitude and direction.

Figure 2:
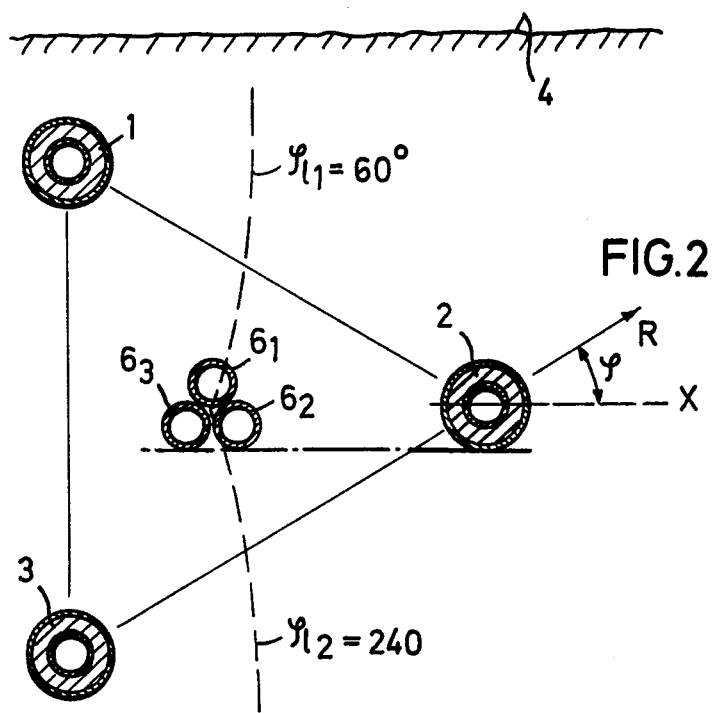

FIG. 2 depicts a second exemplary embodiment. Here, the three single-conductor cables are laid down in the same way as in FIG. 1. However, the three return-flow pipes are all located at the geometric center of the equilateral triangle formed by the three cables, so that longitudinal voltages will not be induced in the pipes. It is to be noted that the geometric center of the triangle coincides with the point of intersection of the two phase angle loci for phase angles $\varphi_{1_1} = 60°$ and $\varphi_{1_2} = 240°$. Thus, in this embodiment, likewise, two or indeed all three of the return-flow pipes can be considered to be positioned on these loci.

Figure 3:
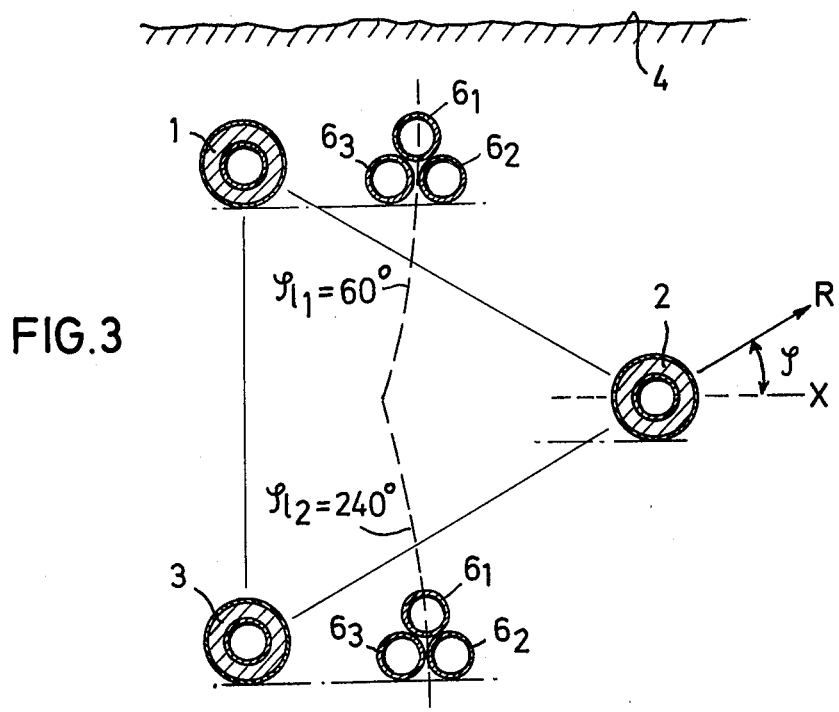

FIG. 3 depicts a third exemplary embodiment. Here again the three single-conductor cables are laid down as in FIG. 1. Here, all three return-flow pipes are identically laid down. Each pipe extends for half its length located on the locus for the phase angle $\varphi_{1_1} = 60°$ and for the other half of its length located on the locus for the phase angle $\varphi_{1_2} = 240°$. For example, each pipe may consist of two successive sections of equal length, one on the 60° locus and the other on the 240° locus; or each pipe may consist of four successive sections of equal length, the first and third on the 60° locus and the second and fourth on the 240° locus; etc. In this way, the longitudinal voltages induced in the successive sections of each pipe cancel each other out, so that here again no net voltage is induced in the pipes.

Figure 4:
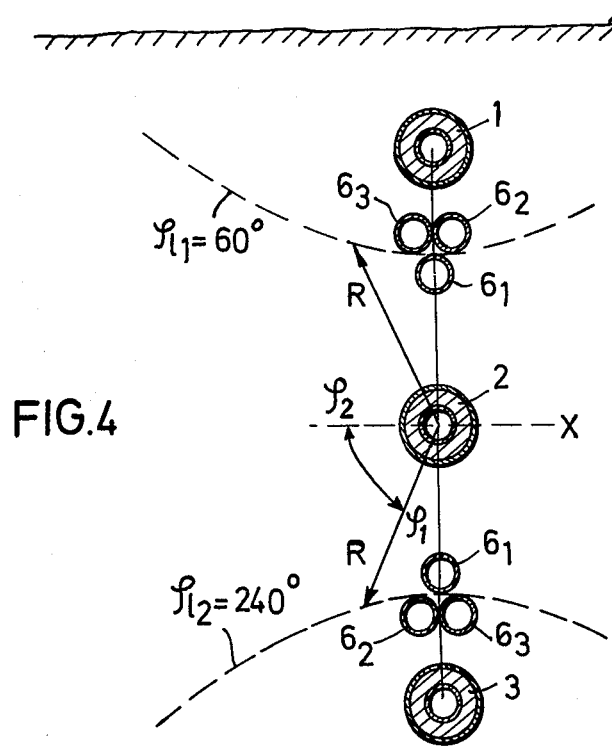

FIG. 4 depicts a fourth exemplary embodiment. Here, the three single-conductor cables 1, 2, 3 are located in a single plane, e.g., vertically one above the next. The three return-flow pipes $6_1, 6_2, 6_3$ are laid down identically to one another. The three pipes together extend for half their length located on the $\varphi_{1_1} = 60°$ locus and for the other half of their length located on the $\varphi_{1_2} = 240°$ locus, as in FIG. 3. Thus, the longitudinal voltages induced in the successive sections of each pipe cancel each other out.

It will be understood that each of the elements described above, or two or more together, may also find a useful application in other types of constructions and set-ups differing from the types described above.

While the invention has been illustrated and described as embodied in a particular type of cable system, it is not intended to be limited to the details shown, since various modification and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention.

What is claimed as new and desired to be protected by Letters Patent is set forth in the appended claims.

1. A three-phase cable system comprising, in combination, three single-conductor cables of the internally water-cooled type; and three return-flow pipes each associated with a respective one of the three cables for returning cooling water, the three return-flow pips being so disposed relative to the three cables that substantially no net longitudinal voltages are induced in the three return-flow pipes.

2. The three-phase cable system defined in claim 1, the three single-conductor cables being laid down located such that viewed in cross-section they are positioned at the vertices of an equilateral triangle, the three return-flow pipes being laid down located such that viewed in cross-section they are positioned on phase angle loci $\varphi_1$ for the voltages induced in them, the loci being defined by the equation $$\varphi_{1_{1,2}} = \arctan \frac{\ln \frac{[a^2 + R^2 + 2aR\cos(\varphi + 30°)]^2}{R^2[a^2 + R^2 + 2aR\cos(\varphi - 30°)]}}{\sqrt{3} \ln \frac{R^2}{[a^2 + R^2 + 2aR\cos(\varphi - 30°)]}}$$

wherein $\varphi_{1_1} \leq 90°$ and $\varphi_{1_2} = \varphi_{1_1} + 180°$, wherein $a$ is the distance between adjoining ones of the cables, wherein R is the distance vector from one of the cables to a return-flow pipe, and wherein the position angle $\varphi$ is the angle between the distance vector and a symmetry line of the cable system.

3. The three-phase cable system defined in claim 1, the three single-conductor cables being laid down arranged in a common plane, the three return-flow pipes being laid down located such that viewed in cross-section they are positioned on phase angle loci $\varphi_1$ for the voltages induced in them, the loci being defined by the equation $$\varphi_{1_{1,2}} = \arctan \left( \frac{-\ln \frac{(a^2 + R^2 - 2aR\sin\varphi)^2}{R^2(a^2 + R^2 + 2aR\sin\varphi)}}{\sqrt{3} \ln \frac{a^2 + R^2 + 2aR\sin\varphi}{R^2}} \right)$$

wherein $\varphi_{1_1} \leq 90°$ and $\varphi_{1_2} = \varphi_{1_1} + 180°$, wherein $a$ is the distance between adjoining ones of the cables, wherein R is the distance vector from the middle one of the cables to a return-flow pipe, and wherein the position angle $\varphi$ is the angle between the distance vector and a symmetry line of the cable system.

4. The three-phase cable system defined in claim 2, all three of the return-flow pipes being located at the point of intersection between the $\varphi_{1_1} = 60°$ phase-angle locus and the $\varphi_{1_2} = 240°$ phase-angle locus at the geometric center of he equilateral triangle.

5. The three-phase cable system defined in claim 2, one return-flow pipe being located at the geometric center of the equilateral triangle, each of the other two return-flow pipes extending for half its length located on the $\varphi_{1_1} = 60°$ phase-angle locus and for the other half of its length located on the $\varphi_{1_2} = 240°$ phase-angle locus.

6. The three-phase cable system defined in claim 2, each of the three return-flow pipes extending for half its length located on the $\varphi_{1_1} = 60°$ phase-angle locus and for the other half of its length located on the $\varphi_{1_2} = 240°$ phase-angle locus.

7. The three-phase cable system defined in claim 3, all three of the return-flow pipes extending identically, each return-flow pipe extending for half its length located on the $\varphi_{1_1} = 60°$ phase-angle locus and for the other half of its length located on the $\varphi_{1_2} = 240°$ phase-angle locus.

* * * * *